(12) United States Patent
Du et al.

(10) Patent No.: US 12,464,659 B2
(45) Date of Patent: Nov. 4, 2025

(54) DISPLAY DEVICE

(71) Applicants: Chengdu BOE Optoelectronics Technology Co., Ltd., Chengdu (CN); BOE Technology Group Co., Ltd., Beijing (CN)

(72) Inventors: Yongqiang Du, Beijing (CN); Hui Zhao, Beijing (CN)

(73) Assignees: Chengdu BOE Optoelectronics Technology Co., Ltd., Chengdu (CN); Beijing BOE Technology Development Co., Ltd., Beijing (CN)

( * ) Notice: Subject to any disclaimer, the term of this patent is extended or adjusted under 35 U.S.C. 154(b) by 170 days.

(21) Appl. No.: 18/032,596

(22) PCT Filed: Nov. 30, 2020

(86) PCT No.: PCT/CN2020/132894
§ 371 (c)(1),
(2) Date: Apr. 19, 2023

(87) PCT Pub. No.: WO2022/110193
PCT Pub. Date: Jun. 2, 2022

(65) Prior Publication Data
US 2023/0389200 A1    Nov. 30, 2023

(51) Int. Cl.
*H05K 5/02*    (2006.01)
(52) U.S. Cl.
CPC ................. *H05K 5/0217* (2013.01)
(58) Field of Classification Search
CPC ............... G06F 1/1652; H05K 5/0217
See application file for complete search history.

(56) References Cited

U.S. PATENT DOCUMENTS 10,602,623 B1    3/2020   Myers
11,140,794 B2 *  10/2021  Ran ...................... G06F 1/1652
(Continued)

FOREIGN PATENT DOCUMENTS

CN    106128312 A    11/2016
CN    205943347 U    2/2017
(Continued)

OTHER PUBLICATIONS

International Search Report and Written Opinion in PCT/CN2020/132894, mailed Aug. 26, 2021, 6 pages.
(Continued)

*Primary Examiner* — Sagar Shrestha
(74) *Attorney, Agent, or Firm* — ArentFox Schiff LLP; Michael Fainberg (57) ABSTRACT

A display device, including: a housing, an accommodating space being provided inside the housing, and an opening is provided on the surface of the housing; a reel, rotatably installed in the accommodating space around its own axis; a flexible display screen, having a start end and a terminal end opposite to each other, and a display surface and a fitting surface opposite to each other; the start end is connected to the reel, the terminal end is in a free state, so that the flexible display screen can be rolled or unfolded around the reel; when the flexible display screen is in a rolled state, the flexible display screen is accommodated in the accommodating space, and when the flexible display screen is in an unfolded state, the terminal end extends out of the housing from the opening; and an adsorption device.

15 Claims, 8 Drawing Sheets

(56) References Cited

U.S. PATENT DOCUMENTS

| | | | |
|---|---|---|---|
| 12,171,075 B2* | 12/2024 | Lee | H05K 5/0217 |
| 2008/0247126 A1* | 10/2008 | Otsuka | G06F 1/1601 |
| | | | 455/73 |
| 2016/0155965 A1* | 6/2016 | Kusuura | H10K 71/50 |
| | | | 29/829 |
| 2017/0013726 A1* | 1/2017 | Han | G09F 15/0062 |
| 2017/0318688 A1 | 11/2017 | Kim et al. | |
| 2018/0228036 A1* | 8/2018 | Mou | H05K 5/0017 |
| 2018/0375054 A1* | 12/2018 | Wang | G06F 1/1652 |
| 2019/0138058 A1* | 5/2019 | Kwon | G09G 3/22 |
| 2019/0182947 A1 | 6/2019 | Xiang et al. | |
| 2020/0184857 A1 | 6/2020 | Lee | |
| 2020/0196459 A1 | 6/2020 | Huang | |
| 2022/0346250 A1* | 10/2022 | Kim | G06F 1/16 |
| 2023/0401984 A1* | 12/2023 | Zeng | G09F 9/301 |

FOREIGN PATENT DOCUMENTS

| | | |
|---|---|---|
| CN | 107067981 A | 8/2017 |
| CN | 107229372 A | 10/2017 |
| CN | 107342018 A | 11/2017 |
| CN | 108597373 A | 9/2018 |
| CN | 108664087 A | 10/2018 |
| CN | 209118664 U | 7/2019 |
| CN | 210223370 U | 3/2020 |
| CN | 111292619 A | 6/2020 |
| CN | 111326069 A | 6/2020 |
| CN | 111365336 A | 7/2020 |
| CN | 111583804 A | 8/2020 |
| TW | 201830192 A | 8/2018 |

OTHER PUBLICATIONS

Office Action in CN202080003114.5, mailed Mar. 20, 2023, 8 pages.

Office Action in CN202080003114.5, mailed Sep. 16, 2023, 6 pages.

* cited by examiner

DISPLAY DEVICE

CROSS-REFERENCE TO RELATED APPLICATION

This application is a national phase entry under 35 U.S.C § 371 of International Application No. PCT/CN2020/132894, filed Nov. 30, 2020, and entitled "DISPLAY DEVICE".

FIELD

The present application relates to the technical field of display, and particularly relates to a display device.

BACKGROUND

Featuring foldability, bendability and low power consumption, flexible display screens have been widely used in portable display devices, such as mobile phones, tablet computers and car displays. As increasing living standard upgrades consumer behavior, flexible display screens, accessories of personal intelligent terminals, will be applied to more scenarios in the future.

However, studies have found that an existing flexible display screen in an unchangeable shape cannot present changeable shapes during displaying, which is likely to cause aesthetic fatigue and poor visual experience of the audience.

SUMMARY

The present application provides a display device, which may achieve an effect that a flexible display screen presents different curved shapes when being unrolled.

In order to achieve the objective, the present application provides a display device, including:
  a housing, an accommodating space being provided inside the housing, and an opening being provided on a surface of the housing;
  a reel, the reel is rotatably installed in the accommodating space around its own axis;
  a flexible display screen, the flexible display screen has a start end and a terminal end opposite each other, and a display surface and a fitting surface opposite each other, where the start end is connected with the reel, and the terminal end is in a free state, so that the flexible display screen is capable of being rolled around the reel or unrolled; and when the flexible display screen is in a rolled state, the flexible display screen is accommodated in the accommodating space, and when the flexible display screen is in an unrolled state, the terminal end extends out of the housing from the opening; and
  an adsorption device, the adsorption device including a display screen adsorption plate located outside the housing, and the display screen adsorption plate has an adsorption surface, so that when the flexible display screen is in an unrolled state, the adsorption device adsorbs the flexible display screen so as to enable the fitting surface to be attached to the adsorption surface.

Preferably, the display device further includes a driving device installed in the accommodating space, and the driving device is configured to drive the reel to rotate around its own axis to drive the flexible display screen to be rolled or unrolled. When the flexible display screen is in a rolled state, the flexible display screen is wound around a surface of the reel.

Preferably, the driving device includes a driving motor and a conveyor belt, the reel is provided with a rotating shaft, the driving motor is provided with a driving shaft, the conveyor belt is connected with the rotating shaft and the driving shaft separately, and the driving shaft drives the rotating shaft to rotate around its own axis by the conveyor belt.

Preferably, a supporting structure is connected between the start end of the flexible display screen and the reel, and the supporting structure is in smooth and transitional connection with the start end.

Preferably, a thickness of the supporting structure is 60 μm-150 μm.

Preferably, the supporting structure is made of rubber.

Preferably, the adsorption device further includes a power device and a power connecting pipe that are located in the accommodating space;
  a hollow structure is provided inside the display screen adsorption plate to form an airflow cavity in communication with the power connecting pipe, and the adsorption surface of the display screen adsorption plate is provided with a plurality of air holes in communication with the airflow cavity; and
  the power device is configured to be connected with the power connecting pipe so as to form adsorption air pressure for adsorbing the flexible display screen at the plurality of air holes.

Preferably, a thickness of the airflow cavity is 10 mm-12 mm.

Preferably, the air holes include a plurality of rows of air holes evenly arranged in an extension direction of the display screen adsorption plate, and each row of air holes includes a plurality of air holes.

Preferably, a diameter of each of the plurality of air holes is 6 mm-10 mm.

Preferably, the display screen adsorption plate has a first end closer to the housing and a second end farther from the housing, a distance between a center of an air hole in a row of air holes closest to the second end and the second end is 25 mm-35 mm, and a distance between a center of an air holes in a row of air holes closest to the first end and the first end is 15 mm-25 mm.

Preferably, the opening is provided with a guide surface, and the guide surface is in smooth and transitional connection with the adsorption surface.

Preferably, the display screen adsorption plate is made of a transparent acrylic plate.

Preferably, the fitting surface is provided with a polyethylene terephthalate (PET) protective film.

Preferably, the display screen adsorption plate is detachably installed on a surface of a side of the housing with the opening.

Preferably, a thickness of the flexible display screen is 100 μm-150 μm.

1—housing; 11—opening; 2—reel; 3—flexible display screen; 31—start end; 32—terminal end; 33—display surface; 34—fitting surface; 4—adsorption device; 41—display screen adsorption plate; 411—airflow cavity; 412—air hole; 413—adsorption surface; 42—power device; 43—power connecting pipe; 5—driving device; 51—driving motor; 52—conveyor belt; 6—supporting structure.

DETAILED DESCRIPTION OF THE EMBODIMENTS

Technical solutions of embodiments of the present application will be clearly and completely described below in conjunction with the accompanying drawings of the embodiments of the present application. Apparently, the embodiments described are merely some rather than all the embodiments of the present application. Based on the embodiments of the present application, all other embodiments obtained by those of ordinary skill in the art without making creative efforts fall within the scope of protection of the present application.

With reference to FIGS. 1-5 and 9-10, the present application provides a display device, which includes: a housing 1, a reel 2, a flexible display screen 3, and an adsorption device 4. An accommodating space is provided inside the housing 1, and an opening 11 is provided on a surface of the housing 1. The reel 2 is located in the accommodating space and is capable of rotating around its own axis. The flexible display screen 3 has a start end 31 and a terminal end 32 opposite each other, and a display surface 33 and a fitting surface 34 opposite each other. The start end 31 of the flexible display screen 3 is connected with the reel 2, and the terminal end 32 is in a free state, so that the flexible display screen 3 is capable of being rolled around the reel 2 or unrolled. When the flexible display screen 3 is in a rolled state, the flexible display screen 3 is accommodated in the accommodating space, and when the flexible display screen 3 is in an unrolled state, the terminal end 32 is capable of extending out of the housing 1 from the opening 11. The adsorption device 4 includes a display screen adsorption plate 41 located outside the housing 1. When the flexible display screen 3 is in an unrolled state, the adsorption device 4 adsorbs the flexible display screen 3 so as to enable the fitting surface 34 to be attached to the display screen adsorption plate 41.

The display device includes the housing 1, the opening 11 is provided on the surface of the housing 1, the reel 2 is placed in the housing 1, and the flexible display screen 3 is connected with the reel 2 and is capable of being rolled around the reel 2 or unrolled. When the flexible display screen 3 is in a rolled state, the display screen is accommodated in the housing 1, and when the flexible display screen 3 is in an unrolled state, the terminal end 32 of the flexible display screen 3 is capable of extending out of the housing 1 from the opening 11. The display screen adsorption plate 41 is provided outside the housing 1. When the flexible display screen 3 is in an unrolled state, the adsorption device 4 may adsorb the flexible display screen 3 so as to enable the flexible display screen to be attached to the display screen adsorption plate 41, so that the flexible display screen 3 is capable of presenting the same shape as the display screen adsorption plate 41. In this case, the display surface 33 is configured to display a picture normally. According to the display device, the flexible display screen 3 is enabled to be attached to the display screen adsorption plate 41 when being unrolled, so that the flexible display screen 3 may present different curved shapes when being unrolled, so as to fully embody a flexible aesthetic feeling.

In this way, the display device provided by the present application may achieve an effect that the flexible display screen 3 presents different curved shapes when being unrolled. In addition, the flexible display screen 3 is accommodated in the housing 1 when being in a rolled state, such that the flexible display screen 3 may be protected and portable.

It should be noted that the display surface 33 is capable of displaying a picture during rolling or unrolling movement of the flexible display screen 3.

Figure 1:
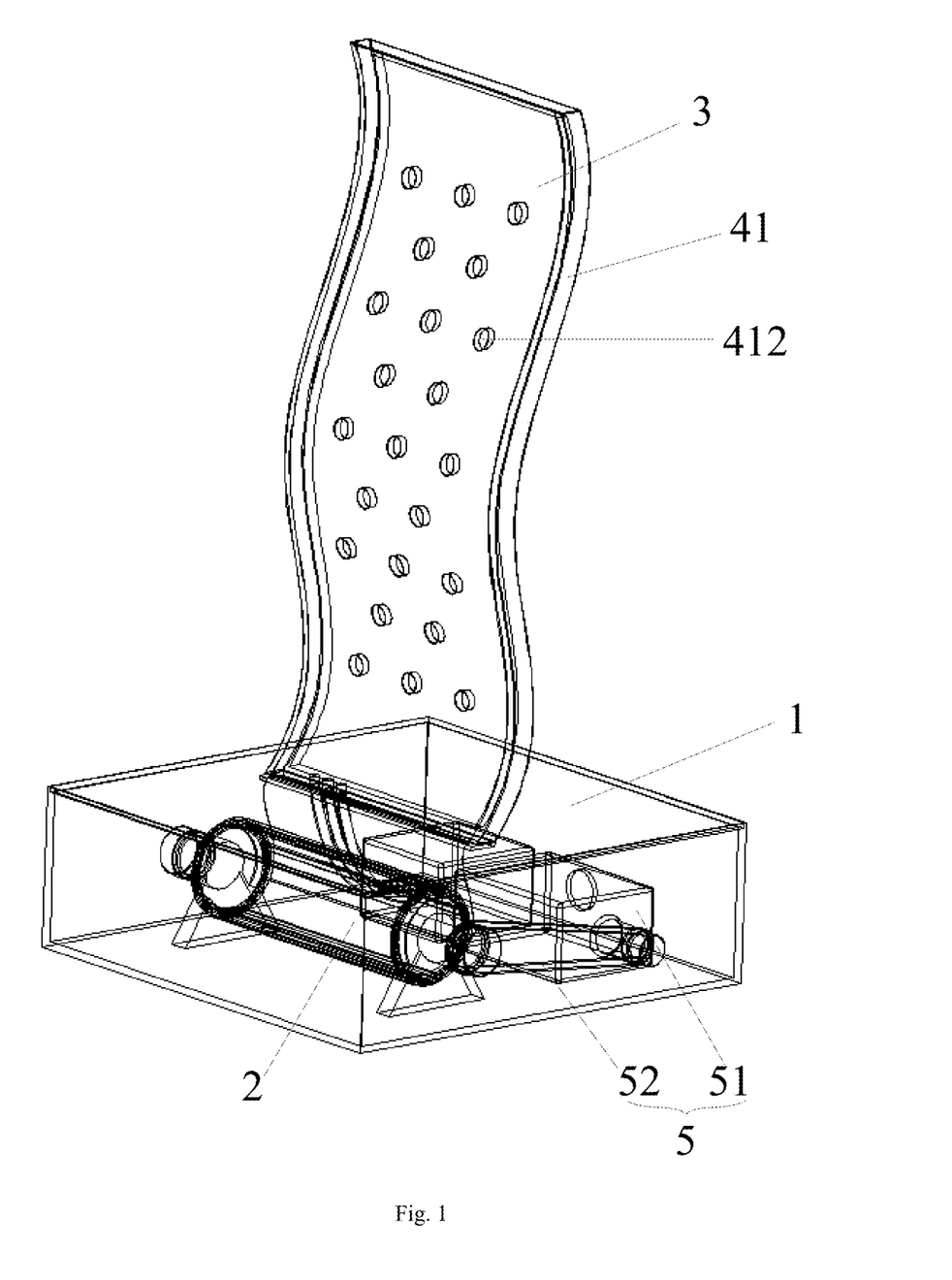
FIG. 1 is a schematic diagram of an entire structure of a display device in the present application.
Figure 2:
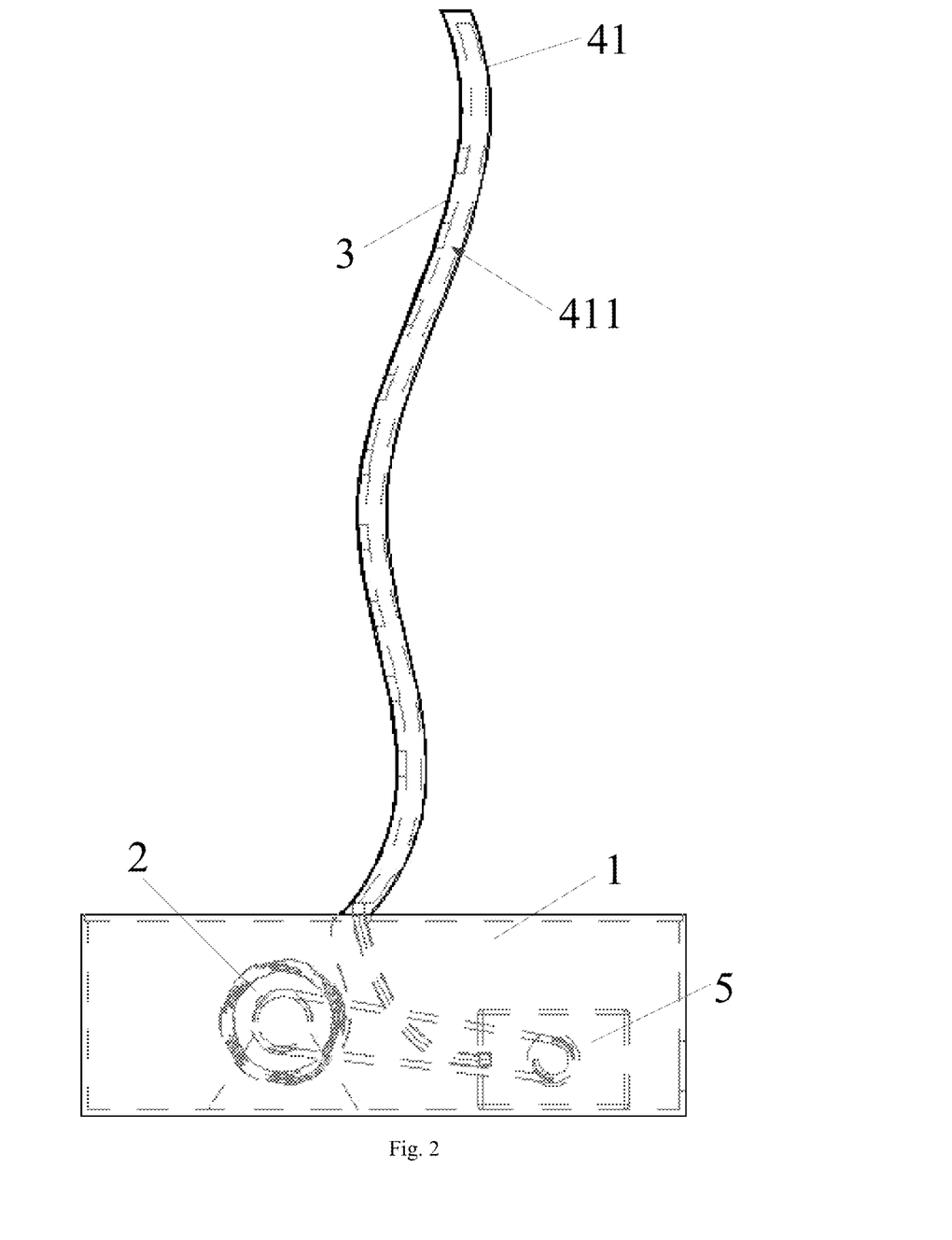
FIG. 2 is a schematic structural diagram of a side view of a display device in the present application.
Figure 3:
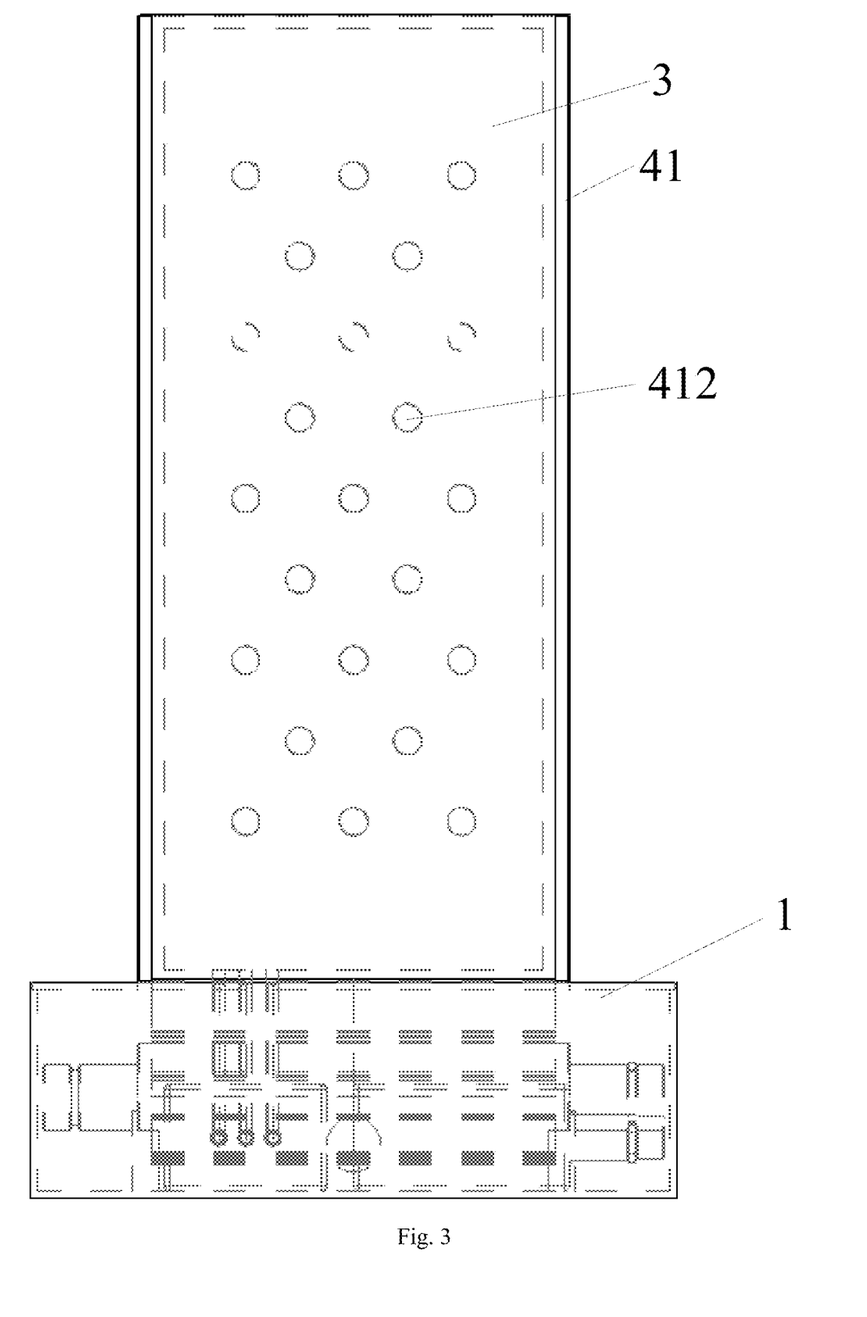
FIG. 3 is a schematic structural diagram of a front view of a display device in the present application.
Figure 4:
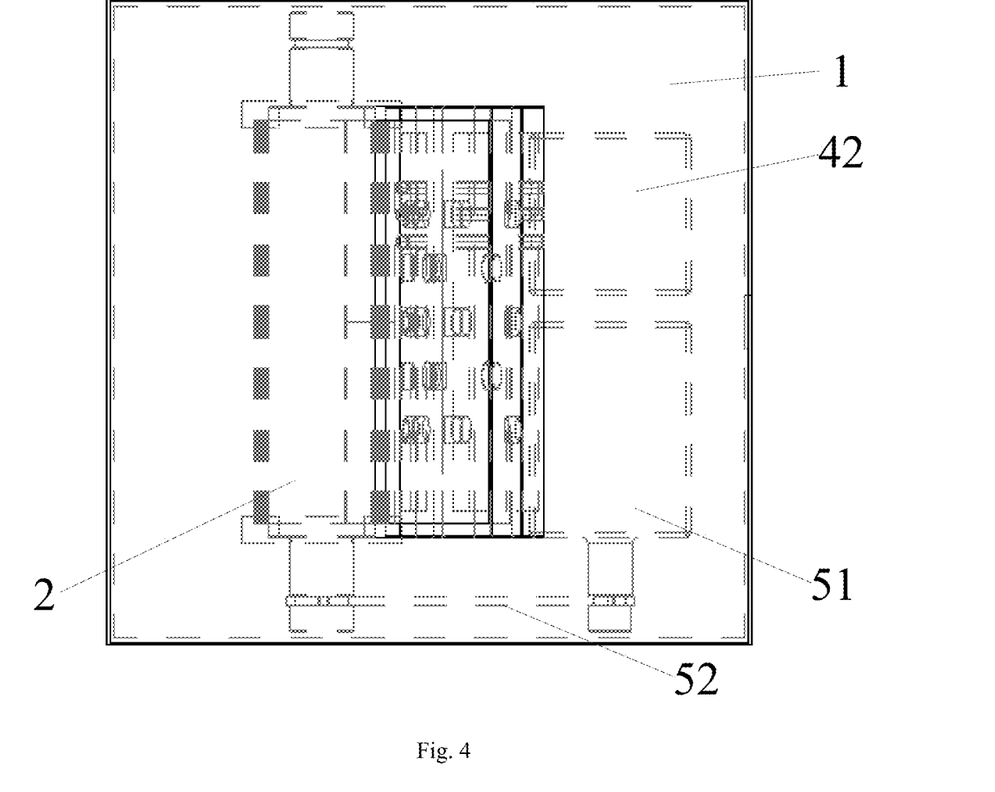
FIG. 4 is a schematic structural diagram of a top view of a display device in the present application.
Figure 5:
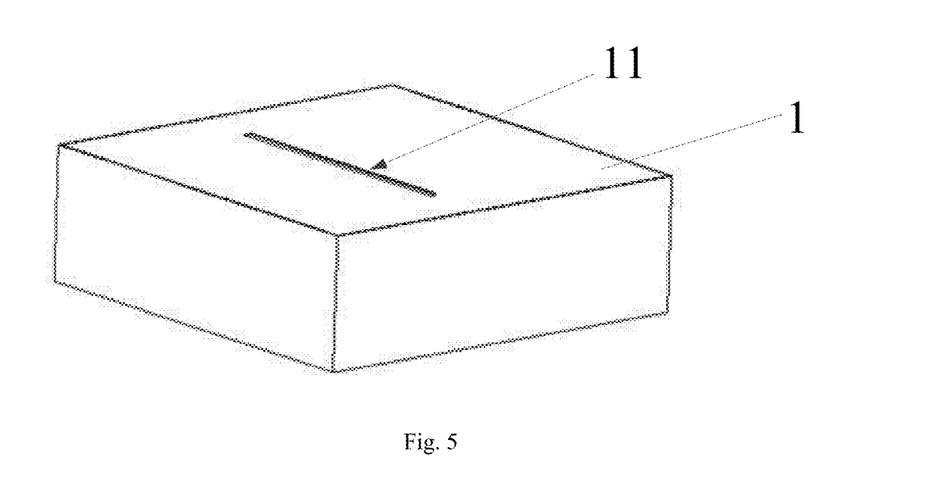
FIG. 5 is a schematic structural diagram of a display device when a flexible display screen is in an accommodated state in the present application.
Figure 7:
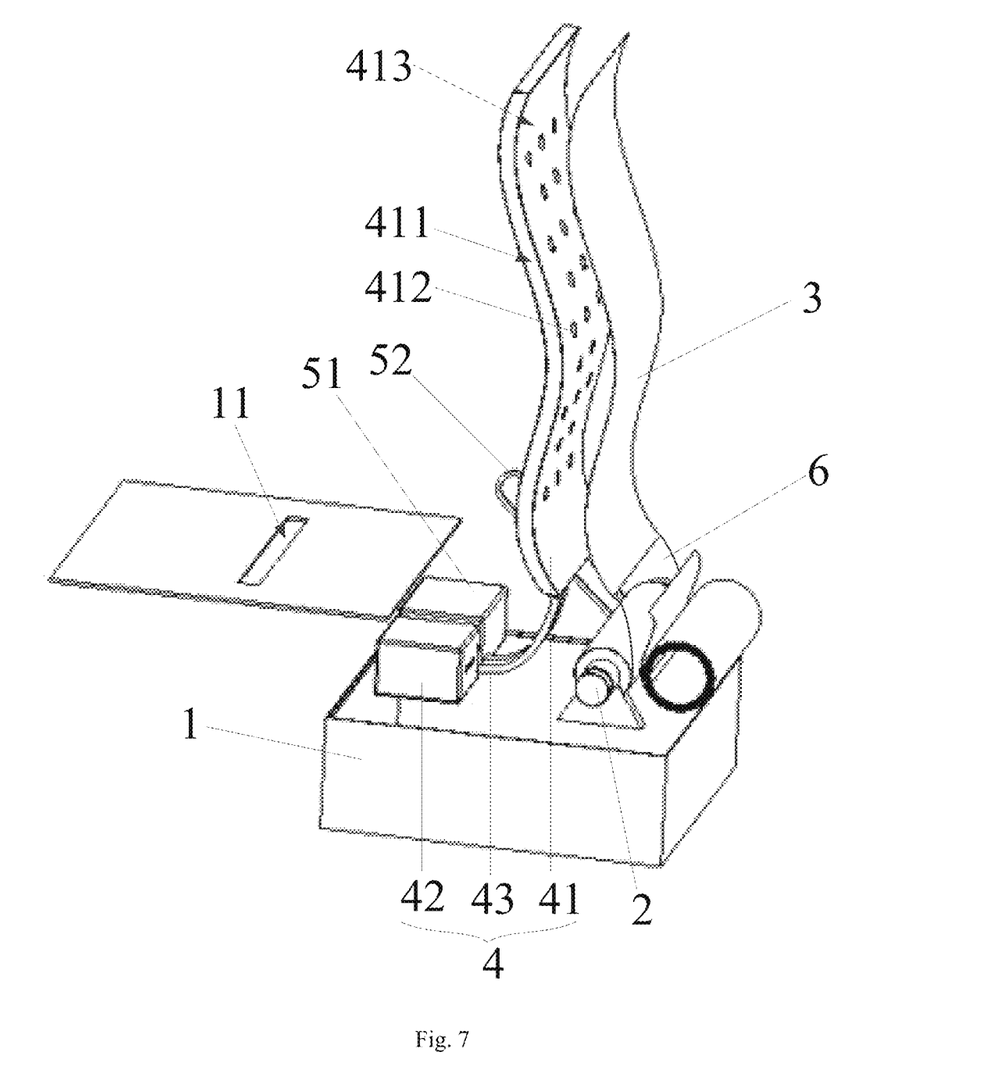
FIG. 7 is a schematic diagram of an explosive view of an entire structure of a display device in the present application.
Figure 8:
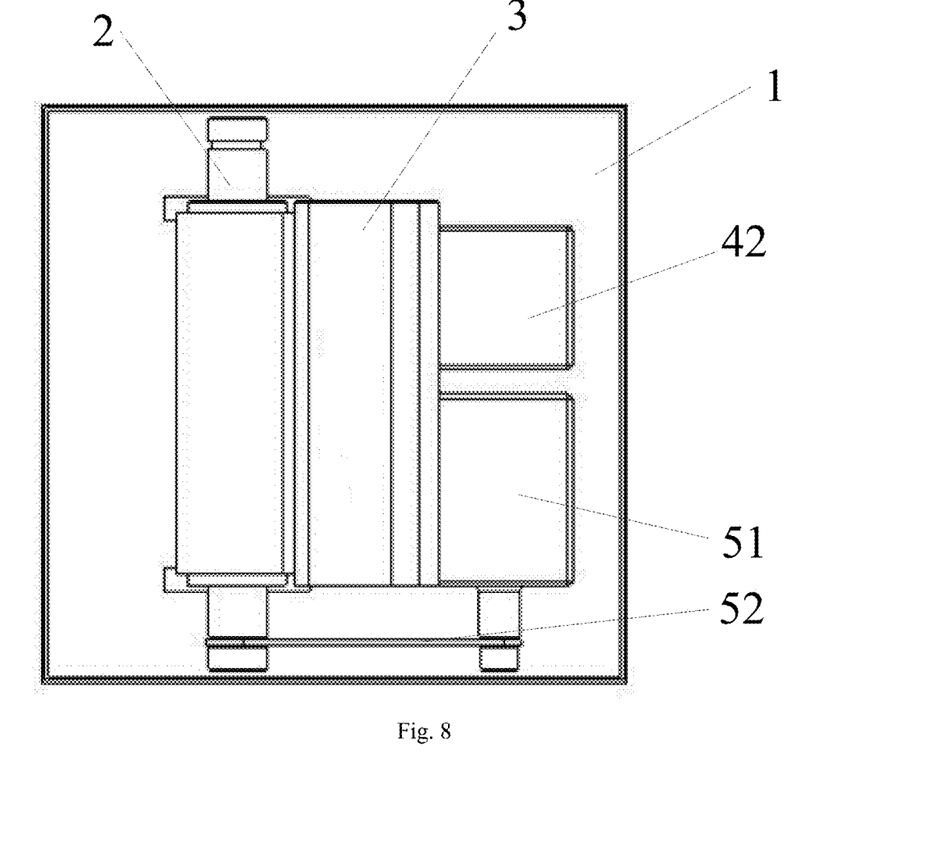
FIG. 8 is a schematic structural diagram of an interior of a housing in the present application.

In an embodiment, with reference to FIGS. 1, 7 and 8, the display device further includes a driving device 5 installed in the accommodating space. The driving device is configured to drive the reel 2 to rotate around its own axis so as to drive the flexible display screen 3 to be rolled or unrolled, so that the flexible display screen 3 may be accommodated and unrolled. The flexible display screen 3 is wound around a surface of the reel 2 when being in a rolled state. As an implementation mode, the driving device 5 may include a driving motor 51 and a conveyor belt 52, the driving motor 51 is provided with a driving shaft, the reel 2 is provided with a rotating shaft, and the conveyor belt 52 is connected with the driving shaft and the rotating shaft separately, so that when the driving motor 51 works, the driving shaft transmits power to the conveyor belt 52, and the conveyor belt 52 may drive the rotating shaft to rotate. In this way, the reel 2 is capable of rotating around its own axis. Meanwhile, the flexible display screen 3 may be automatically rolled and unrolled, such that the flexible display screen 3 has a smaller size after being rolled, and portability is improved.

It should be noted that when the driving device 5 drives the reel 2 to rotate so as to enable the flexible display screen 3 to be rolled or unrolled, the driving device 5 may be further configured to control a rolling length or an unrolling length of the flexible display screen 3. As an implementation mode, for controlling the rolling length or the unrolling length of the flexible display screen 3, the rolling length or the unrolling length of the flexible display screen 3 may be controlled by the driving device 5 through a single chip microcomputer or programmable logic controller (PLC), a PLC program is set on the driving device 5 according to a size of the flexible display screen 3, and the driving device 5 is controlled to be turned on or off by automatically controlling and measuring the rolling length or the unrolling length of the flexible display screen 3, so that the flexible display screen 3 may be prevented from being damaged by excessive rolling or unrolling. Use requirements of the display device by different users in different scenes may be fully satisfied by controlling the rolling length or unrolling length of the flexible display screen 3, so that the display device is more convenient to use and more adaptable.

Figure 9:
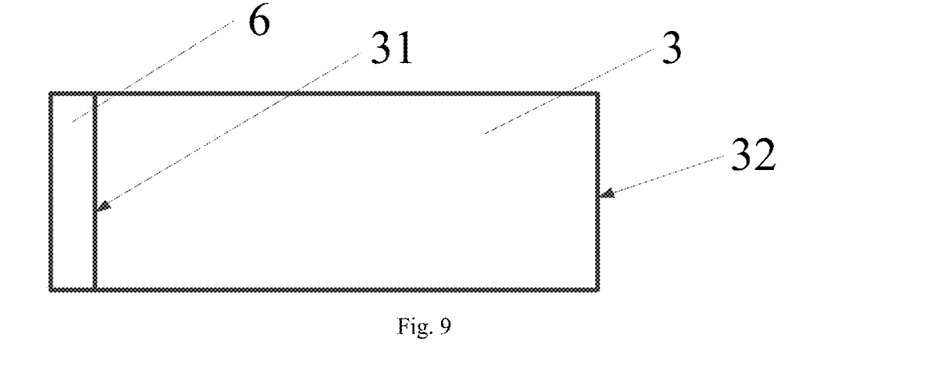
FIG. 9 is a schematic structural diagram of a top view of a flexible display screen and a supporting structure in the present application.
Figure 10:
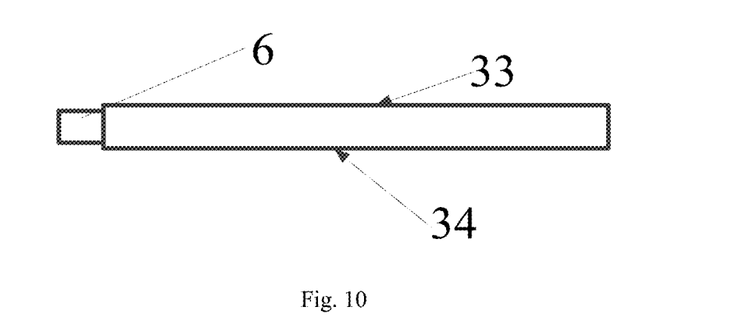
FIG. 10 is a schematic structural diagram of a side view of a flexible display screen and a supporting structure in the present application.

In an embodiment, with reference to FIGS. 7, 9 and 10, in the display device, a supporting structure 6 is connected between the start end 31 of the flexible display screen 3 and the reel 2, and the supporting structure 6 is in smooth and transitional connection with the start end 31 and is fixedly connected with the reel 2. By providing the supporting structure 6, the flexible display screen 3 may be prevented from being damaged by stress concentrated at the edge of the flexible display screen in a rolling process, so that the flexible display screen 3 may be smoother in the rolled state and unrolled state.

Specifically, the supporting structure 6 may be preferably made of rubber or other elastic materials, and a thickness of the supporting structure may be 60 μm-150 μm, so that the flexible display screen 3 is better prevented from being damaged by the stress concentrated at the edge of the flexible display screen in a rolling process.

Figure 6:
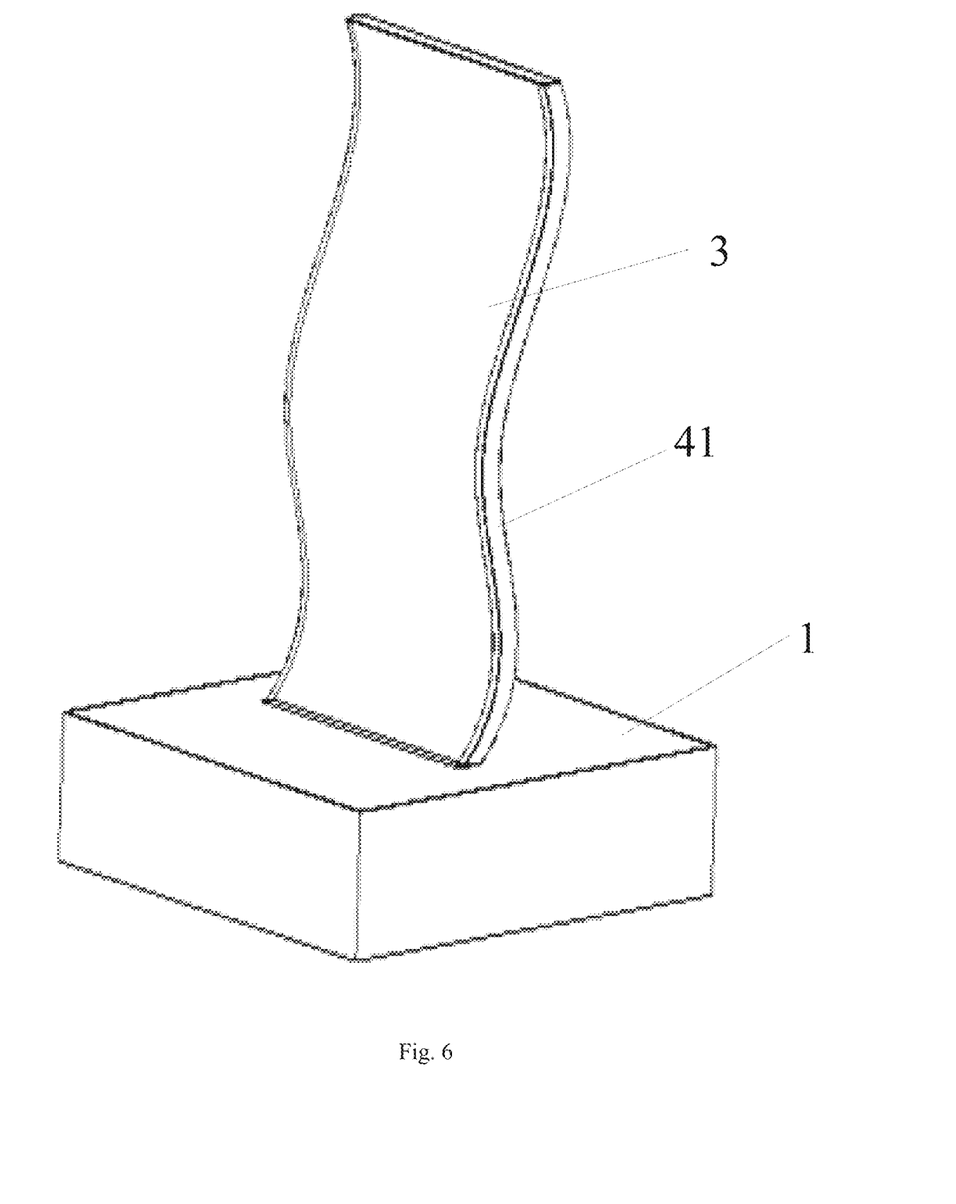
FIG. 6 is a schematic structural diagram when a flexible display screen is attached to a display screen adsorption plate in the present application.

In an embodiment, with reference to FIGS. 6 and 7, the adsorption device 4 in the present application further includes a power device 42 and a power connecting pipe 43 that are located in the accommodating space. Meanwhile, a hollow structure is provided inside the display screen adsorption plate 41 to form an airflow cavity 411 in communication with the power connecting pipe 43, and the adsorption surface 413, configured to be attached to the flexible display screen 3, of the display screen adsorption plate 41 is provided with a plurality of air holes 412 in communication with the airflow cavity 411. The power device 42 is configured to be connected with the power connecting pipe 43, and form adsorption air pressure at the air holes 412 on the adsorption surface 413 through airflow changes in the airflow cavity 411 when the power connecting pipe 43 is in communication with the airflow cavity 411. In this way, the flexible display screen 3 is completely attached to the display screen adsorption plate. With the above structure, the power device 42 may control airflow in the airflow cavity 411 according to a size of the display screen, so as to control the adsorption air pressure of different sizes, so that display screens with different sizes may be better attached to the display screen adsorption plate 41, and further a better display effect may be ensured.

It should be noted that in the embodiment, a thickness of the airflow cavity 411 may be 10 mm-12 mm, so that sufficient airflow in the airflow cavity 411 may be ensured to form the adsorption air pressure at the air holes 412.

It should also be noted that in the embodiment, with reference to FIG. 7, the plurality of air holes 412 include a plurality of rows of air holes 412 evenly arranged in an extension direction of the display screen adsorption plate 41. Each row of air holes 412 includes a plurality of air holes 412. The even adsorption air pressure of each air hole 412 may be better ensured by evenly arranging the air holes 412, so that the flexible display screen 3 may be better attached to the display screen adsorption plate 41, and a display effect may be further ensured.

Specifically, as an implementation mode, a diameter of each air hole may be selected to be 6 mm-10 mm. Based on even arrangement of the plurality of rows of air holes 412, the display screen adsorption plate has a first end closer to the housing and a second end farther from the housing, a distance between a center of an air hole in a row of air holes 412 closest to the second end and the second end is 25 mm-35 mm, and a distance between a center of an air hole in a row of air holes 412 closest to the first end and the first end is 15 mm-25 mm. The above arrangement of the air holes 412 may better achieve an attaching effect between the flexible display screen 3 and the display screen adsorption plate 41. The distance between the center of the air hole in the row of air holes 412 closest to the second end and the second end is preferably 30 mm, and the distance between the center of the air hole in the row of air holes 412 closest to the first end and the first end is preferably 20 mm.

It should be noted that the center of the above air hole 412 may be understood as a central axis of the air hole 412. Moreover, because a distance between an uppermost row of air holes 412 and the second end is small, that is, a width of an upper end of the display screen adsorption plate 41 without the air holes 412 is small, even if the flexible display screen 3 completely covers the display screen adsorption plate 41, the flexible display screen 3 may be kept completely attached to the display screen adsorption plate 41.

It should be noted that the above arrangement of the air holes 412 is only illustrative, and the arrangement may also be designed according to different requirements.

It should also be noted that when the flexible display screen 3 is in an unrolled state or in a process of retracting into the housing 1 from an unrolled state, the opening 11 has a guide surface, and the guiding surface is smoothly connected with the adsorption surface 413 so as to prevent the flexible display screen 3 from being scratched when being unrolled or retracted. Meanwhile, the housing 1 may be made of metal, acrylic or other materials.

In addition, the adsorption surface 413 of the display screen adsorption plate 41 and the guide surface are located on the same side of the opening 11, and an included angle between the adsorption surface 413 of the display screen adsorption plate 41 and the surface of the opening 11 is 90°-135°, so that the flexible display screen 3 may be smoothly adsorbed to the adsorption surface 413 when extending out of the opening 11. Meanwhile, the included angle should not be too large, so as to prevent the flexible display screen 3 from being damaged by stress concentrated at the opening 11.

In order to ensure a shape effect of the flexible display screen 3 fixed to the display screen adsorption plate 41, the display screen adsorption plate 41 may be made of a transparent acrylic plate, etc. Meanwhile, if a curved shape needs to be changed in a display process, the display screen adsorption plate 41 may be made of materials with low-modulus and easy to mold, so as to change a shape in a use process. Alternatively, the display screen adsorption plate 41 is detachably installed on a surface of a side of the housing 1 with the opening 11. When a shape of the unrolled flexible display screen 3 needs to be changed, different shapes of the flexible display screen during display may be achieved by replacing the display screen adsorption plate 41. Furthermore, with reference to FIG. 5, since the display screen adsorption plate 41 is detachably installed outside the housing 1, when the flexible display screen 3 is rolled and accommodated in the housing 1, the display screen adsorption plate 41 may be detached, so that a size of the display device is reduced, and further portability is improved.

Furthermore, the fitting surface 34 of the flexible display screen 3 is provided with a polyethylene terephthalate (PET) protective film. The protective film has scratch resistance and high reliability, so that flatness of the flexible display screen 3 in the rolling or unrolling process may be further ensured.

In an embodiment, in order to achieve a better display effect, the flexible display screen 3 may be, but is not limited to, a transparent narrow-bezel display screen. The transparent narrow-bezel display screen may include: a back protective film, a first transparent optical adhesive, an organic light-emitting diode (OLED) display panel, a second transparent optical adhesive, and a front protective film, and the second transparent optical adhesive and the front protective film may be removed as appropriate. With the structure, a thickness range of the flexible display screen 3 may be 100 μm-150 μm. With the thickness, not only the flexible display screen 3 may be better rolled on the reel 2, but also a stress difference between a structural layer closest to the reel and a structural layer farthest from the reel of the flexible display screen 3 is smaller, which is more conducive to rolling of the flexible display screen 3 and enables the flexible display screen to be better attached to the display screen adsorption plate 41.

Apparently, those skilled in the art can make various modifications and variations to the examples of the present application without departing from the spirit and scope of the present application. In this way, if the modifications and variations of the present application fall within the scope of the claims of the present application and their equivalent technologies, the present application is also intended to cover the modifications and variations.

What is claimed is:

1. A display device, comprising:
   a housing, wherein an accommodating space is provided inside the housing, and an opening is provided on a surface of the housing;
   a reel, rotatably installed in the accommodating space around its own axis;
   a flexible display screen, having a start end and a terminal end opposite each other, and a display surface and a fitting surface opposite each other; wherein the start end is connected with the reel, and the terminal end is in a free state to allow the flexible display screen is capable of being rolled around the reel or unrolled; and when the flexible display screen is in a rolled state, the flexible display screen is accommodated in the accommodating space, and when the flexible display screen is in an unrolled state, the terminal end extends out of the housing from the opening;
   an adsorption device, comprising a display screen adsorption plate located outside the housing, and the display screen adsorption plate is provided with an adsorption surface, wherein when the flexible display screen is in an unrolled state, the adsorption device adsorbs the flexible display screen to enable the fitting surface to be attached to the adsorption surfaces;
   wherein the start end of the flexible display screen is connected to the reel via a supporting structure, and the supporting structure is in smooth and transitional connection with the start end; and
   wherein the adsorption device further comprises a power device and a power connecting pipe located in the accommodating space; a hollow structure is provided inside the display screen adsorption plate to form an airflow cavity in communication with the power connecting pipe, and the adsorption surface of the display screen adsorption plate is provided with a plurality of air holes in communication with the airflow cavity; and the power device is configured to be connected with the power connecting pipe to form adsorption air pressure for adsorbing the flexible display screen at the plurality of air holes.

2. The display device according to claim 1, further comprising a driving device installed in the accommodating space; wherein the driving device is configured to drive the reel to rotate around its own axis to drive the flexible display screen to be rolled or unrolled, and when the flexible display screen is in a rolled state, the flexible display screen is wound around a surface of the reel.

3. The display device according to claim 2, wherein the driving device comprises a driving motor and a conveyor belt, the reel is provided with a rotating shaft, the driving motor is provided with a driving shaft, the conveyor belt is connected with the rotating shaft and the driving shaft separately, and the driving shaft drives the rotating shaft to rotate around its own axis by the conveyor belt.

4. The display device according to claim 1, wherein a thickness of the supporting structure is 60 μm-150 μm.

5. The display device according to claim 1, wherein the supporting structure is made of rubber.

6. The display device according to claim 1, wherein a thickness of the airflow cavity is 10 μm-12 μm.

7. The display device according to claim 1, wherein the air holes comprise a plurality of rows of air holes evenly arranged in an extension direction of the display screen adsorption plate, and each row of air holes comprise a plurality of air holes.

8. The display device according to claim 7, wherein a diameter of each of the plurality of air holes is 6 μm-10 μm.

9. The display device according to claim 8, wherein the display screen adsorption plate has a first end closer to the housing and a second end farther from the housing, a distance between a center of an air hole in a row of air holes closest to the second end and the second end is 25 mm-35 mm, and a distance between a center of an air hole in a row of air holes closest to the first end and the first end is 15 mm-25 mm.

10. The display device according to claim 1, wherein the opening is provided with a guide surface, and the guide surface is in smooth and transitional connection with the adsorption surface.

11. The display device according to claim 10, wherein an included angle between the adsorption surface and a surface of a side of the housing with the opening is 90°-135°.

12. The display device according to claim 1, wherein the display screen adsorption plate is made of a transparent acrylic plate.

13. The display device according to claim 1, wherein the fitting surface is provided with a polyethylene terephthalate (PET) protective film.

14. The display device according to claim 1, wherein the display screen adsorption plate is detachably installed on a surface of a side of the housing with the opening.

15. The display device according to claim 1, wherein a thickness of the flexible display screen is 100 μm-150 μm.

* * * * *